US008229737B2

(12) United States Patent
Williams

(10) Patent No.: US 8,229,737 B2
(45) Date of Patent: Jul. 24, 2012

(54) NAME CLASSIFIER TECHNIQUE

(75) Inventor: Charles K. Williams, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/683,176

(22) Filed: Jan. 6, 2010

(65) Prior Publication Data

US 2010/0114812 A1    May 6, 2010

Related U.S. Application Data

(63) Continuation-in-part of application No. 11/281,885, filed on Nov. 18, 2005, now abandoned.

(60) Provisional application No. 60/630,037, filed on Nov. 23, 2004.

(51) Int. Cl.
*G10L 15/00* (2006.01)
*G06F 19/00* (2011.01)
*G10L 21/00* (2006.01)

(52) U.S. Cl. .................. 704/9; 704/1; 704/10; 707/3

(58) Field of Classification Search ............... 704/1, 9, 704/10; 707/3
See application file for complete search history.

(56) References Cited

U.S. PATENT DOCUMENTS

| | | | |
|---|---|---|---|
| 4,965,763 A | 10/1990 | Zamora | |
| 5,832,480 A | 11/1998 | Byrd, Jr. et al. | |
| 5,991,714 A | 11/1999 | Shaner | |
| 6,507,829 B1 | 1/2003 | Richards et al. | |
| 6,963,871 B1 | 11/2005 | Hermansen et al. | |
| 7,031,908 B1 | 4/2006 | Huang et al. | |
| 7,249,013 B2 | 7/2007 | Al-Onaizan et al. | |
| 2004/0122675 A1 | 6/2004 | Nefian et al. | |
| 2004/0146200 A1 | 7/2004 | Andel et al. | |
| 2005/0004862 A1 | 1/2005 | Kirkland et al. | |
| 2007/0005578 A1 | 1/2007 | Patman et al. | |

OTHER PUBLICATIONS

Branting, L.K., "Name Matching in Law Enforcement and Counter-Terrorism", ICAIL Workshop on Data Mining, Information Extraction, and Evidentiary Reasoning for Law Enforcement and Counter-Terrorism, Jun. 11, 2005, 4 pp.
Du, M., "Approximate Name Matching", Master's Degree project Stockholm, Sweden 2005, 55 pp.
Keselj, V., F. Peng, N. Cercone, and C. Thomas, "N-Gram-Based Author Profiles for Authorship Attribution", Pacific Association for Computational Linguistics, 2003, 10 pp.
Lewis, S., K. McGrath, and J. Reuppel, "Language Identification and Language Specific Letter-to-Sound Rules", Colorado Research in Linguistics, vol. 17, No. 1, 2004, 8 pp.
Maison, B., S.F. Chen, and P.S. Cohen, "Pronunciation Modeling for Names of Foreign Origin", Proceedings of ASRU, US Virgin Islands, 2003, 6 pp.
Wolinski, F., F. Vichot, and B. Dillet, "Automatic Processing of Proper Names in Texts", European Chapter Meeting of the ACL Archive. Proceedings of the Seventh Conference on European Chapter of the Association for Computational Linguistics, 1995, 8 pp.

*Primary Examiner* — Justin Rider
(74) *Attorney, Agent, or Firm* — Janaki K. Davda; Konrad Raynes & Victor LLP

(57) ABSTRACT

A particular technique for classifying a name includes accessing a name; dividing the name into a series of first n-grams; forming multiple concatenated second n-grams by concatenating pairs of the first n-grams; for each of multiple groups, for each of the second n-grams, determining the term frequency-group frequency score; for each of the multiple groups, summing up the term frequency-group frequency scores for each second n-gram for that group; and determining a likelihood that the name belongs to one group of the multiple groups based on the summed scores, wherein a largest summed score indicates a greater likelihood that the name belongs to the one group.

21 Claims, 6 Drawing Sheets

300

$$((0.5 + (0.5 * (\text{number of times the second n-gram occurs in a group}))/(\text{number of times a most common n-gram occurs in the group})) \\ * \\ ((\text{number of times the second n-gram occurs in the group})/(\text{number of times the second n-gram occurs in the multiple groups}))$$

NAME CLASSIFIER TECHNIQUE

CROSS-REFERENCE TO RELATED APPLICATIONS

This application is a continuation-in-part of and claims priority from U.S. application Ser. No. 11/281,885, filed on Nov. 18, 2005, and entitled "NAME CLASSIFIER ALGORITHM", which claims priority from U.S. Provisional Application Ser. No. 60/630,037, filed on Nov. 23, 2004, and entitled "NAME CLASSIFIER ALGORITHM," the entire contents of which are incorporated herein by reference in their entirety for all purposes.

BACKGROUND

1. Field

This disclosure relates to name processing.

2. Description of the Related Art

Various techniques (e.g., algorithms) exist for classifying names as belonging to a particular language, including techniques that are based on n-gram analysis. Various techniques also exist for categorizing documents in large collections to facilitate information retrieval.

However, there is still a need for an improved name classifier technique.

BRIEF SUMMARY

Provided are a method, computer program product, and system for accessing a name; dividing the name into a series of first n-grams; forming multiple concatenated second n-grams by concatenating pairs of the first n-grams; for each of multiple groups, for each of the second n-grams, determining the term-frequency-group frequency score using equation: ((0.5+(0.5*(number of times the second n-gram occurs in a group))/(number of times a most common n-gram occurs in the group))*((number of times the second n-gram occurs in the group)/(number of times the second n-gram occurs in the multiple groups)); for each of the multiple groups, summing up the term frequency-group frequency scores for each second n-gram for that group; and determining a likelihood that the name belongs to one group of the multiple groups based on the summed scores, wherein a largest summed score indicates a greater likelihood that the name belongs to the one group.

BRIEF DESCRIPTION OF THE SEVERAL VIEWS OF THE DRAWINGS

Referring now to the drawings in which like reference numbers represent corresponding parts throughout:

FIG. 3 illustrates a term frequency-group frequency equation in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

With embodiments, various techniques (e.g., algorithms) are described for classifying names. In particular, the names are classified as belonging to a group, such as a language or a culture. A language may be described as spoken or written words. A culture may be described geographically (e.g., people from a particular region of the world may share a similar culture). Certain embodiments use information on the relative frequency of the name in one language or culture versus other languages or cultures. In certain embodiments, a group is formed by a combination of languages and cultures.

Figure 1:
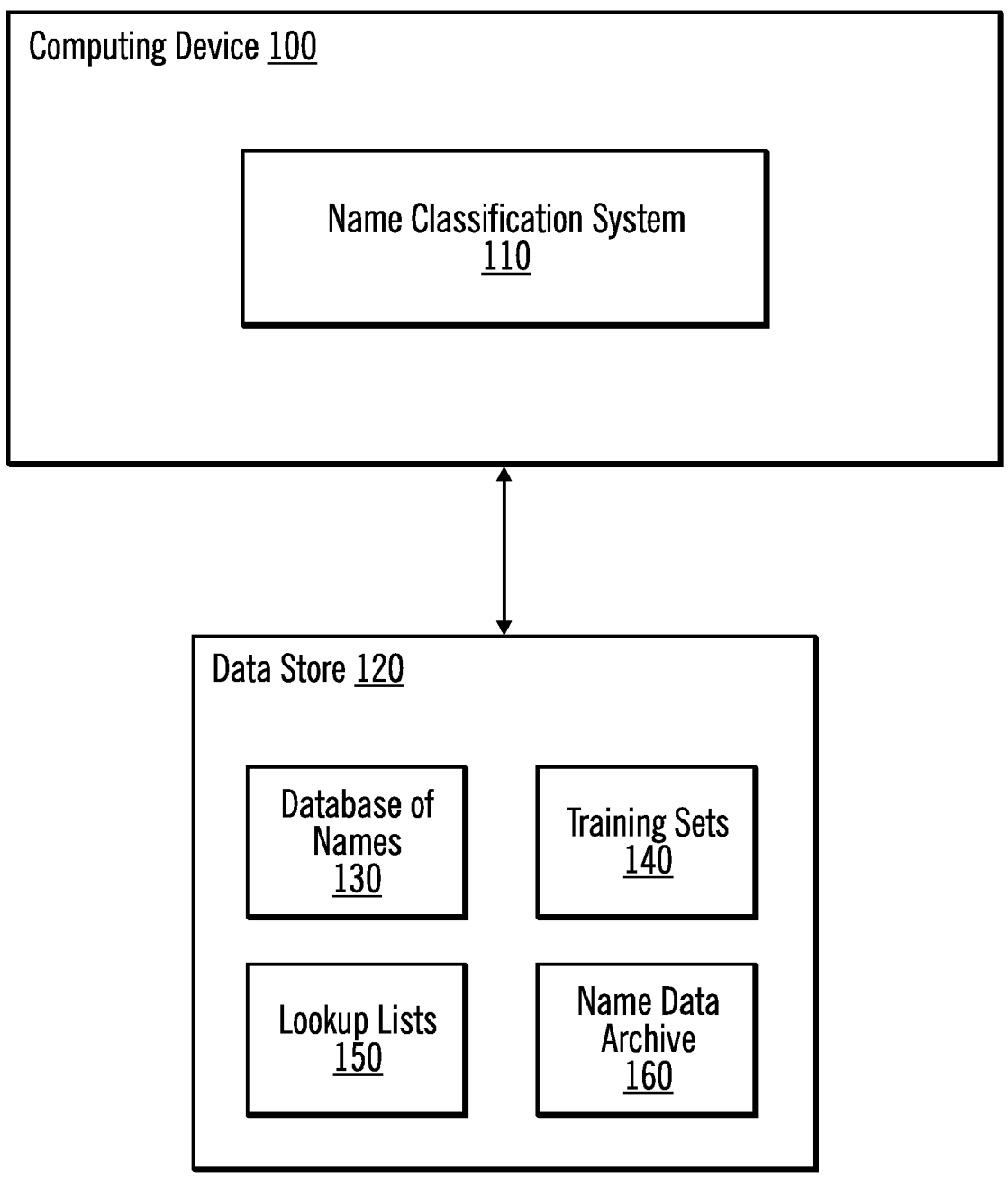
FIG. 1 illustrates, in a block diagram, a computing environment in accordance with certain embodiments of the invention.

FIG. 1 illustrates, in a block diagram, a computing environment in accordance with certain embodiments of the invention. In FIG. 1, a computing device 100 is coupled to a data store 120. The data store 120 includes a database of names 130, training sets 140, lookup lists 150, and a name data archive 160. The database of names 130 stores, for each group (e.g., for each of multiple languages and multiple cultures), lists of names that correspond to given names in that group and lists of names that correspond to surnames in that group. A training set 140 may be described as a set of known names for a particular group (e.g., language or culture). Lookup lists 150 may be described as lists having names that are each known to be associated with particular groups (e.g., languages and/or cultures). A name data archive 160 may be described as a collection of names in the world (e.g., 800 million names) and has been used to determine that the average length of name segments is between six and seven letters.

The computing device 100 includes a name classification system 110. The name classification system receives an input name (e.g., a name of a person), uses the database of names 130 to identify a group (e.g., language or culture) to which the input name belongs, and outputs the group.

In certain embodiments, the name classification system 110 accesses a name and divides the name into a series of n-grams, including at least a first n-gram and a second n-gram. The name classification system 110 concatenates at least the first n-gram and the second n-gram to form a concatenated n-gram and determines a likelihood that the concatenated n-gram belongs to a first group. The name classification system 110 further determines a likelihood that the name belongs to the first group based on the likelihood that the concatenated n-gram belongs to the first group.

In certain embodiments, the name classification system 110 classifies the name as belonging to the first group based on the likelihood that the name belongs to the first group. In various embodiments, the first n-gram and the second n-gram need not be sequential, may overlap, and/or may be separated in the name. In certain embodiments, the name classification system 110 normalizes the likelihood that the name belongs to the first group.

In certain embodiments, the name classification system 110 determines likelihoods that each of a series of concatenated n-grams belong to the first group. The name classification system 110 determines the likelihood that the name belongs to the first group based on the determined likelihoods that each of the series of concatenated n-grams belongs to the first group. The name classification system 110 determines the likelihood that the name belongs to the first group by adding up the likelihoods that each of the series of concatenated n-grams belongs to the first group. The name classification system 110 determines the likelihood that the name belongs to the first group by dividing the sum of the likelihoods by the number of concatenated n-grams added up.

In certain embodiments, the name classification system 110 determines the likelihood that the concatenated n-gram belongs to the first group based on the determination of Equation (1):

$$0.5+(0.5*(\text{number of times an n-gram occurs in the first group})/(\text{number of times a most common n-gram occurs in the first group}). \quad \text{Equation (1)}$$

In certain embodiments, the name classification system 110 determines the likelihood that the concatenated n-gram belongs to the first group based on the determination on an indication of relative frequency of occurrences of the concatenated n-gram in (a) the first group versus (b) multiple groups. The name classification system 110 may base the determination on an indication of relative frequency of occurrences based on the determination of the following Equation (2):

$$(\text{number of times a concatenated n-gram occurs in the first group})/(\text{number of times the concatenated n-gram occurs in multiple groups}). \quad \text{Equation (2)}$$

In certain embodiments, the name classification system 110 determines the likelihood that the concatenated n-gram belongs to the first group based on the determination of a Term Frequency (TF)-Group Frequency (GF) score (or TF-GF score) using the following Equation (3):

$$\text{TF-GF}=(0.5+(0.5*(\text{number of times the concatenated n-gram occurs in the first group})/(\text{number of times a most common n-gram occurs in the first group}))*(\text{number of times the concatenated n-gram occurs in the first group})/(\text{number of times the concatenated n-gram occurs in multiple groups}). \quad \text{Equation (3)}$$

In certain embodiments, the name classification system 110 may include determining a likelihood that the concatenated n-gram belongs to a second group. In such embodiments, the name classification system 110 determines a likelihood that the name belongs to the second group based on the likelihood that the concatenated n-gram belongs to the second group. The name classification system 110 classifies the name as belonging to either the first group or the second group based on the likelihoods that the name belongs to the first group and the second group.

Figure 2:
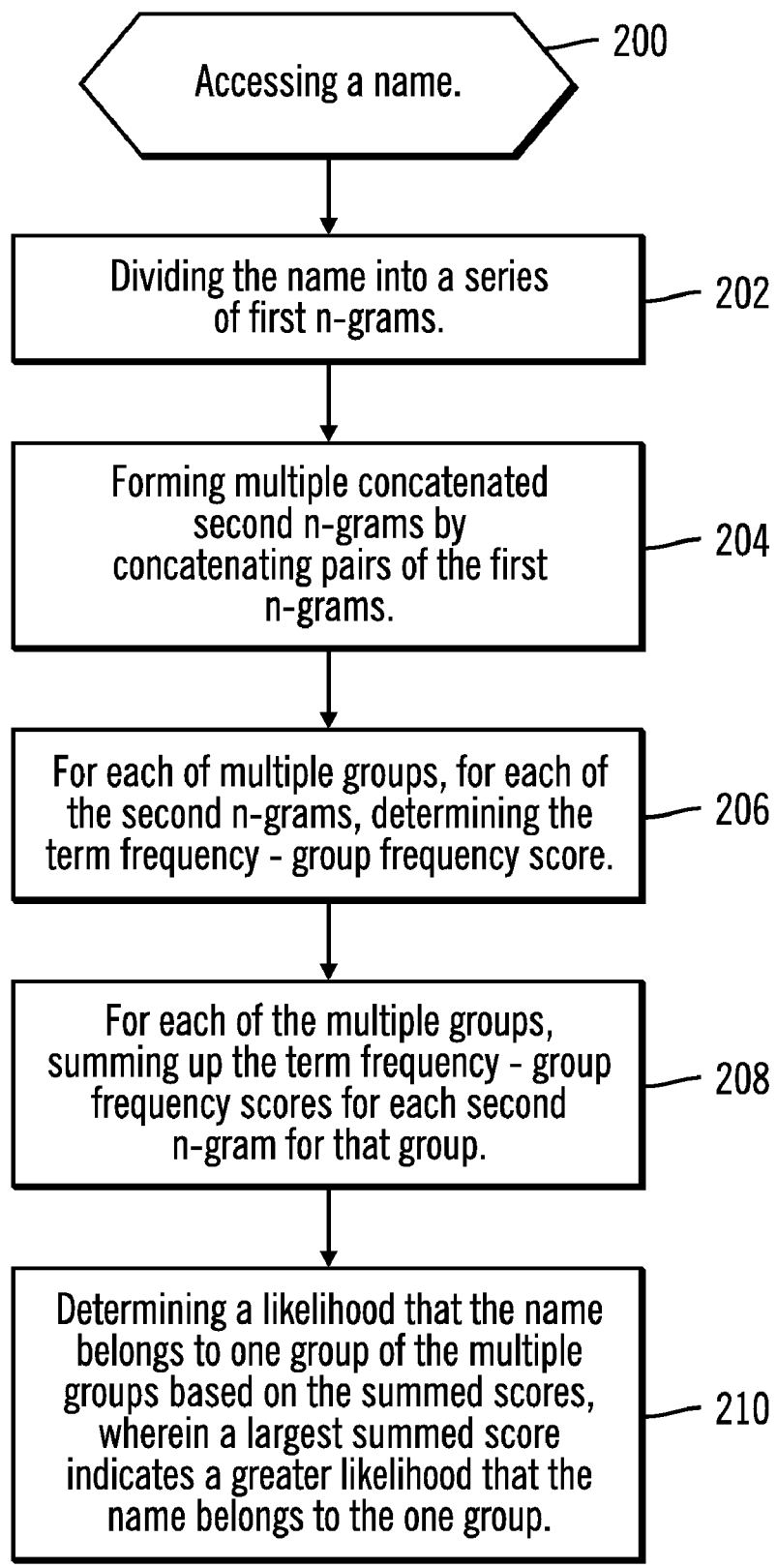
FIG. 2 illustrates, in a flow diagram, logic performed by a name classification system for determining a likelihood that a name belongs to a first group in accordance with certain embodiments.

FIG. 2 illustrates, in a flow diagram, logic performed by the name classification system 110 for determining a likelihood that a name belongs to a first group in accordance with certain embodiments. Control begins in block 200 with the name classification system 110 accessing a name. In block 202, the name classification system 110 divides the name into a series of first n-grams. In certain embodiments, the first n-grams are trigrams. In block 204, the name classification system 110 forms multiple concatenated second n-grams by concatenating pairs of the first n-grams. In certain embodiments, the second n-grams are sixgrams. In block 206, for each of multiple groups, for each of the second n-grams, the name classification system 110 determines the term frequency-group frequency score. For example, if there are three groups represented by Language A, Language B, and Language C, and there are ten sixgrams, then, the name classification system 110 determines the term-frequency-group frequency score for each of the ten sixgrams in each of the three groups. Thus, for each sixgram, there would be three term frequency-group frequency scores (one for Language A, one for Language B, and one for Language C). In block 208, for each of the multiple groups, the name classification system 110 sums up the term frequency-group frequency scores for each second n-gram for that group. Returning to the example of three groups, the name classification system 110 sums up the scores of the ten sixgrams for Language A, sums up the scores of the ten sixgrams for Language B, and sums up the scores of the ten sixgrams for Language C. In block 210, the name classification system determines a likelihood that the name belongs to one group of the multiple groups based on the summed scores, wherein a largest summed score indicates a greater likelihood that the name belongs to the one group. For example, if Language C has the largest summed score, then the name classification system 110 determines that the name is most likely to belong to Language C.

In certain embodiments, the pairs of the first n-gram are not sequential. In certain embodiments, pairs of the first n-gram overlap. In certain embodiments pairs of the first n-gram are separated in the name.

FIG. 3 illustrates a term frequency-group frequency equation 300 in accordance with certain embodiments. In certain embodiments, the name classification system 110 determines a term frequency-group frequency score for each second n-gram using the following Equation (4), shown as equation 300 in FIG. 3:

$$((0.5+(0.5*(\text{number of times the second n-gram occurs in a group})/(\text{number of times a most common n-gram occurs in the group}))*(\text{number of times the second n-gram occurs in the group})/(\text{number of times the second n-gram occurs in the multiple groups})) \quad \text{Equation (4)}$$

In certain embodiments, the name classification system 110 uses scoring logic based in part on an analogy with techniques commonly used to categorize documents in large collections to facilitate information retrieval. The research problem in document classification and retrieval is how to determine the relative weights the various words contained in a document should contribute to the overall "aboutness" of the document. Within document retrieval systems, this is often accomplished by measuring the Term Frequency (TF)-Inverse Document Frequency (IDF) score (or TF-IDF score) for each term in a given document collection. The intuitive idea is that, although a particular word may occur many times in a document, it is probably not very important if it also occurs in most or every document within the collection. For instance, a word like "the" will occur many times in a document, but will also occur in every document likely to be found in a collection. It should therefore not be a good indicator of any particular document, no matter how many times it may occur. The TF-IDF calculation quantifies this intuition.

Assume a document collection contains 2000 documents. Also assume word "A" occurs in the first document 10 times, and word "B" occurs in the first document 10 times. The most commonly occurring word in the document is "the," which occurs 100 times. Word "A" appears in 15 documents across the collection, word "B" occurs in 400, and "the" occurs in all 2000 documents. To calculate the TF-IDF scores for each of these words, the following Equation (5) is used to calculate the Term Frequency (TF) score:

$$\text{TF}=0.5+(0.5*n\text{term})/\text{max}n \quad \text{Equation (5)}$$

In Equation (5), nterm describes a number of times a word occurs in the document, and maxn describes a number of times a most frequently occurring word occurs in the document. Although there are other formulas available for calculating term frequency, this one seems to work well.

To calculate the TF-IDF scores for each of the words, the following Equation (6) is used to calculate the Inverse Document Frequency (IDF) score:

$$IDF=\log(ndocs/termdocs) \quad \text{Equation (6)}$$

In Equation (6), ndocs describes a number of documents in the collection, and termdocs describes a number of documents a particular term occurs in. By using this ratio, the inverse is obtained: a term that occurs often will therefore have a small IDF calculation.

TF-IDF is the product of these two numbers, as illustrated in Equation (7):

$$TF\text{-}IDF=TF*IDF \quad \text{Equation (7)}$$

Since word "A" and word "B" each occur 10 times in the document, they will have the same TF score:

$$TF=0.5+(0.5*10)/100=0.55.$$

However, the IDF scores for word "A" and word "b" differ, since they do not occur in the same number of documents. The following are the IDF scores for word "A" and word "B":

$$IDF(A)=\log(2000/15)=2.125$$

$$IDF(B)=\log(2000/400)=0.699$$

The TF-IDF scores for word "A" and word "B" are:

$$TF\text{-}IDF(A)=0.55*2.125=1.16875$$

$$TF\text{-}IDF(B)=0.55*0.699=0.38445$$

Thus, word "A" is the better choice for classifying the example document (i.e., word "A" is a better indicator of the document's "aboutness").

Again, the word "the" occurred most often in the document. The word "the" has a TF score of:

$$TF(the)=0.5+(0.5*100)/100=1.0,$$

The TF score of 1.0 for the word "the" may indicate that the word "the" is important. However, because the word "the" occurs in every document, the word "the" has a low IDF score:

$$IDF(the)=\log(2000/2000)=\log(1)=0$$

Thus, the TF-IDF score for "the" will also be 0, indicating correctly that "the" is not a good indicator of the topic of the document.

Embodiments modify this document retrieval approach and use the modified approach on name classification.

N-grams may be mapped onto words, and groups (e.g., languages or cultures) may be mapped onto documents. For the occurrence of any particular n-gram in a group (e.g., a language or a culture), the name classification system 110 finds out how relevant that n-gram is for the identification of that group. Suppose, then, that in a particular example group (e.g., in a database of names for that group), n-gram "A" occurs 10 times, as does n-gram "B." The most commonly occurring n-gram in the group occurs 100 times. To calculate the TF-GF scores for each of these words, the following Equation (8) is used to calculate the Term Frequency (TF) score:

$$TF=(0.5+(0.5*n\text{-}n\text{-}grams))/\max\text{-}n\text{-}grams \quad \text{Equation (8)}$$

In Equation (8), n–n-grams describes a number of times the n-gram (e.g. a sixgram) occurs in the first group, and max–n-grams describes a number of times that an n-gram that occurs most frequently occurs in the first group. For example, if an n-gram occurs 10 times in the first group, then n–n-grams is 10. For example, if the n-gram that occurs most frequently occurs 1000 times, then maxn is 1000.

With reference to Equation (8), the TF scores for the n-gram "A" and the n-gram "B" are identical to the ones calculated above for the words "A" and "B" in the example document, i.e., TF=0.55. At this point, however, the analogy with document retrieval diverges. Although the number of n-grams is potentially very large (e.g., there are over 450,000 possible fourgram combinations), phonotactic constraints limit the possibility that certain n-grams are in many groups (e.g., languages or cultures). Phonotactic constraints may be described as limitations on the possibility of a sound in a certain position (e.g., the beginning) of a word. That is, many of the same n-grams are likely to be found in most groups. The number of n-grams that actually occur is much smaller, and, therefore, identical n-grams are likely to occur in most groups. This fact would render the TF-IDF scores for most n-grams equivalent to the example above with the word "the": they would have relevance scores approaching 0. Thus, there would be no way of determining whether n-gram "A" or n-gram "B" is a better indicator of the target group.

However, although it is likely that multiple groups (e.g., all of the groups) will contain both n-gram "A" and n-gram "B", different groups will contain the n-grams with different frequencies, and the name classification system 110 uses this information to predict how valuable any particular n-gram is in identifying a group. Suppose n-gram "A" occurs 100 times across all the groups in a training set 140, while n-gram "B" occurs 500 times. Intuitively, n-gram "A" is more relevant in identifying the example group than is n-gram "B," since 10% of the occurrences of n-gram "A" are in the example group (10 out of 100), while only 2% of the occurrences of n-gram "B" (10 out of 500) appear in the example group. N-gram "A" should therefore contribute more than n-gram "B" to the overall score of any name being analyzed in the example group.

To calculate a weighted n-gram score for a particular group, the name classification system 110 multiplies the TF score (i.e., the weighting based on how often an n-gram occurs with respect to the most frequently occurring n-gram in the group) with the frequency of occurrence across all the groups of interest. Analogous to the document retrieval example above, this score is called the Term Frequency (TF)-Group Frequency (GF) score (or TF-GF score). To calculate the TF-GF scores for each of the words, the following Equation (9) is used to calculate the Group Frequency (GF) score:

$$GF=n\text{-}gram\_L/n\text{-}gram\_all\_L \quad \text{Equation (9)}$$

In Equation (9), n-gram_describes a number of times the n-gram occurs in a particular group, and n-gram_all_L describes a number of times the n-gram occurs in all groups.

TF-GF is the product of the two numbers obtained from Equation (8) and Equation (9), as illustrated in Equation (10):

$$TF\text{-}GF=TF*GF \quad \text{Equation (10)}$$

For the current example, the following are the TF-GF scores for n-gram "A" and n-gram "B":

$$TF\text{-}GF(A):0.55*(10/100)=0.55*0.1=0.055$$

$$TF\text{-}GF(B):0.55*(10/500)=0.55*0.02=0.011$$

The TF-GF score quantitatively captures the intuition that n-gram "A" is a better indicator of the example group than n-gram "B." The GF portion is a distinct point of departure from the analogy with the document retrieval IDF system. The GF ratio (i) looks at the number of occurrences of n-grams, not the number of groups; (ii) counts occurrences in a given group; and (iii) does not invert the resulting ratio.

Experiments with both simple bigrams and simple fourgrams confirm that the TF-GF approach is better than scoring over the simple concatenation of probability scores, in which only the TF values are used. Scores with bigrams improved approximately 14% with this approach, while fourgram scores improved approximately 17%.

Based on the TF-GF equation, the ideal n-gram from a group identification perspective would have a score of 1.0, which is the maximum score. Such an n-gram would occur in only one group and would be the most frequently occurring n-gram in the group. Assume, for example, that an n-gram occurs 50 times among all groups in the training sets 140 and all those occurrences are in the same group. Assume further that the most frequent n-gram in that group occurs 50 times. The score for such an n-gram in that group would therefore be:

$$[0.5+(0.5*50)/50]*50/50=(0.5+0.5)*1.0=1.0$$

Positing the existence of such an ideal n-gram allows normalizing scores even when names appear on lookup lists 150. Lookup lists 150 may be described as lists having names that are each known to be associated with particular groups. In certain embodiments, such hard-coded names are assumed to consist of ideal sixgrams and, hence, receive a score of 1.0. Since it is statistically highly unlikely for a name not on a lookup list to obtain such a score, hard-coded names win while remaining on the same scale as names scored using the TF-GF equation. Scores are now a number between 0 and 1.0, making it easier for customers to evaluate how likely it is a name might be from a group other than the winning group returned by the implementation.

The frequency counts used in calculating the TF-GF scores are static probability counts based on the occurrence of n-grams found in sets of training data. In certain embodiments, two training sets 140 are maintained for each group, one containing given name data and the other surname data. In certain embodiments, separate training sets 140 for the entire collection of given name and surname data from all of the groups combined (needed as described above to calculate the GF portion of the TF-GF score) are not maintained, but are created dynamically. This greatly simplifies upkeep of the training data since making changes to any individual set of training data does not require a second adjustment to a master list.

In certain embodiments, the parsing units (i.e., n-grams) for which probabilities are determined are sixgrams, based on concatenations of the trigrams found in a name. A sequence of trigram combinations is created across the name in order to provide a more holistic assessment of the name's orthographic characteristics. First, the initial trigram in the name is combined with all successive trigrams in the name. The same process then proceeds from the second trigram in the word, and so on. For the name <Smith>, the name classification system 110 creates the following sixgrams:

| <SMSMI | SMIMIT | MITITH | ITHTH> |
|--------|--------|--------|--------|
| <SMMIT | SMIITH | MITTH> | |
| <SMITH | SMITH> | | |
| <SMTH> | | | |

With certain embodiments, for the sixgrams for the name <Smith>, the first and last trigrams assume a pad (space) on the ends of the name, and so only have two letters. The name classification system 110 determines a score for the name <Smith> for each group by adding up the TF-GF scores of each n-gram above.

With embodiments, various combinations of letter groupings in the name are used. This may simulate the process the human mind goes through while looking for recognizable patterns in a name. Also, embodiments provide more material for measurement than simple n-grams alone. For instance, padded names broken into trigrams contain as many trigrams as there are letters in the word, e.g., <Smith> contains five: <SM SMI MIT ITH TH>. The same name using the wholeword approach yields ten units that can be measured. The following formula yields the number of sixgrams that will be created for a name (where n=the number of letters in the name):

$$n(n-1)/2$$

For example, names of 4 letters yield 6 sixgrams, names of 5 letters yield 10 sixgrams, and names of 6 letters yield 15 sixgrams. Names with fewer than four letters may not benefit from this approach (i.e., names with three letters contain three sixgrams; names with two letters contain one; names consisting of a single letter cannot be analyzed with this technique since no sixgrams can be created from them). A name data archive 160 may be described as a collection of names in the world (e.g., 800 million names) and has been used to determine that the average length of name segments is between six and seven letters. Most names therefore benefit from having the additional units to measure that a concatenation approach provides. The concatenation approach creates the combination of n-grams that are analyzed.

Once the sixgrams are formed, for each of multiple groups, for each of the sixgrams, the name classification system 110 determines the term frequency-group frequency score. Next, for each of the multiple groups, the name classification system 110 sums up the term frequency-group frequency scores for each sixgram for that group. The name classification system determines a likelihood that the name belongs to one group of the multiple groups based on the summed scores, wherein a largest summed score indicates a greater likelihood that the name belongs to the one group.

The TF-GF scoring has been empirically confirmed through testing. Experimentation determined trigrams to be the optimal units to combine. Both bigram combinations (yielding fourgrams) and fourgram combinations (yielding eightgrams) scored lower in testing than the trigram combination pattern illustrated above. Using this whole-word concatenation approach to create the parsing units resulted in an increase in accuracy rates of approximately 8% over using simple fourgrams alone, and an even greater improvement over simple trigrams.

Certain embodiments train on given names and surnames separately, and a distinct TF-GF score is generated for each field. These TF-GF scores are combined to create the final, composite score for a given name and surname combination.

Figure 4:
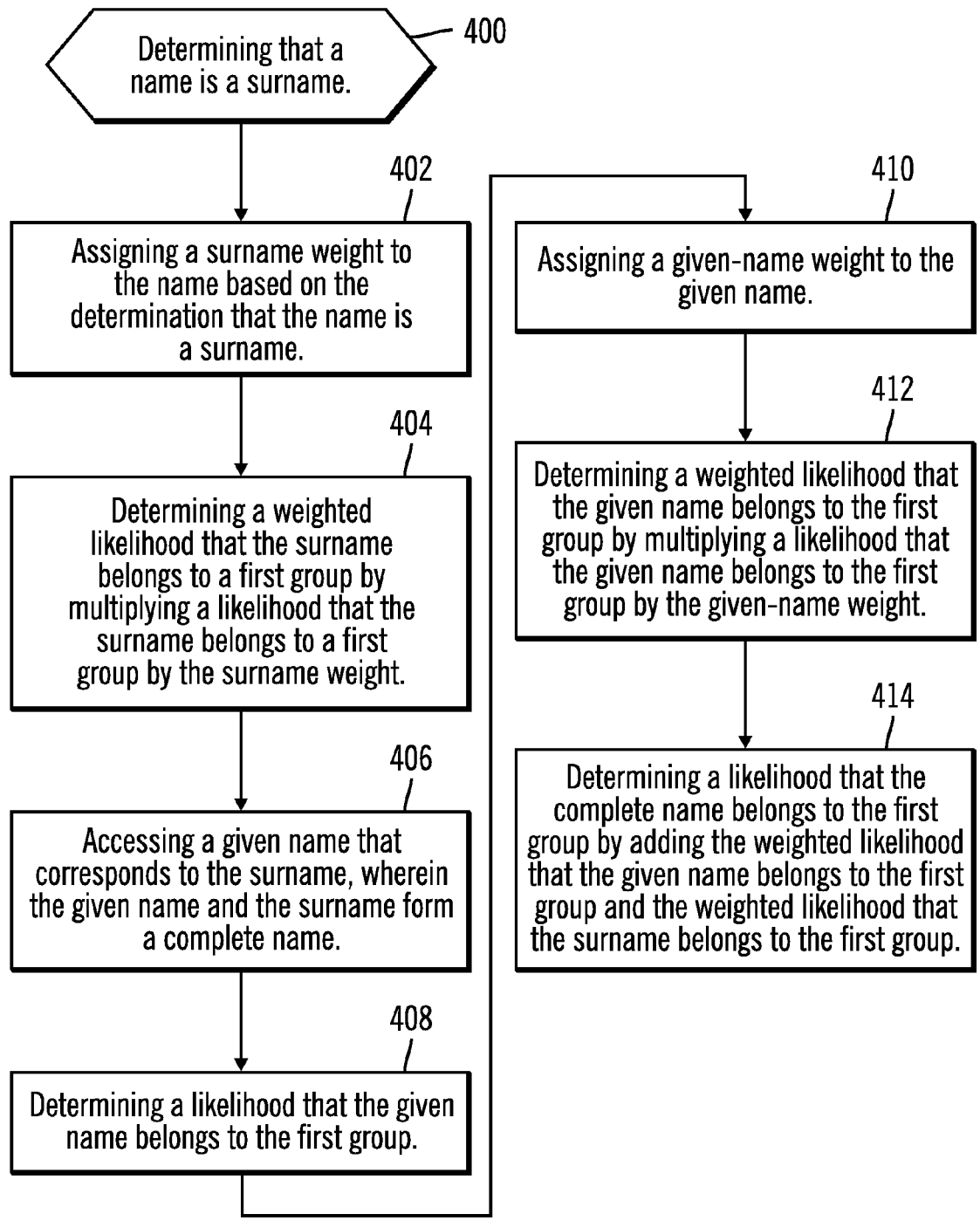
FIG. 4 illustrates, in a flow diagram, logic performed by a name classification system for given names and surnames in accordance with certain embodiments.

FIG. 4 illustrates, in a flow diagram, logic performed by a name classification system for given names and surnames in accordance with certain embodiments. Control begins in block 400 with the name classification system 110 determining that a name is a surname. In block 402, the name classification system 110 assigns a surname weight to the name based on the determination that the name is a surname. In block 404, the name classification system 110 determines a weighted likelihood that the surname belongs to a first group by multiplying a likelihood that the surname belongs to a first group by the surname weight. In block 406, the name classification system 110 accesses a given name that corresponds to the surname, wherein the given name and the surname form a complete name. In block 408, the name classification system 110 determines a likelihood that the given name belongs to the first group. In block 410, the name classification system 110 assigns a given-name weight to the given name. In block 412, the name classification system determines a weighted likelihood that the given name belongs to the first group by multiplying a likelihood that the given name belongs to the first group by the given-name weight. In block 414, the name classification system 110 determines a likelihood that the complete name belongs to the first group by adding the weighted likelihood that the given name belongs to the first group and the weighted likelihood that the surname belongs to the first group.

Figure 5:
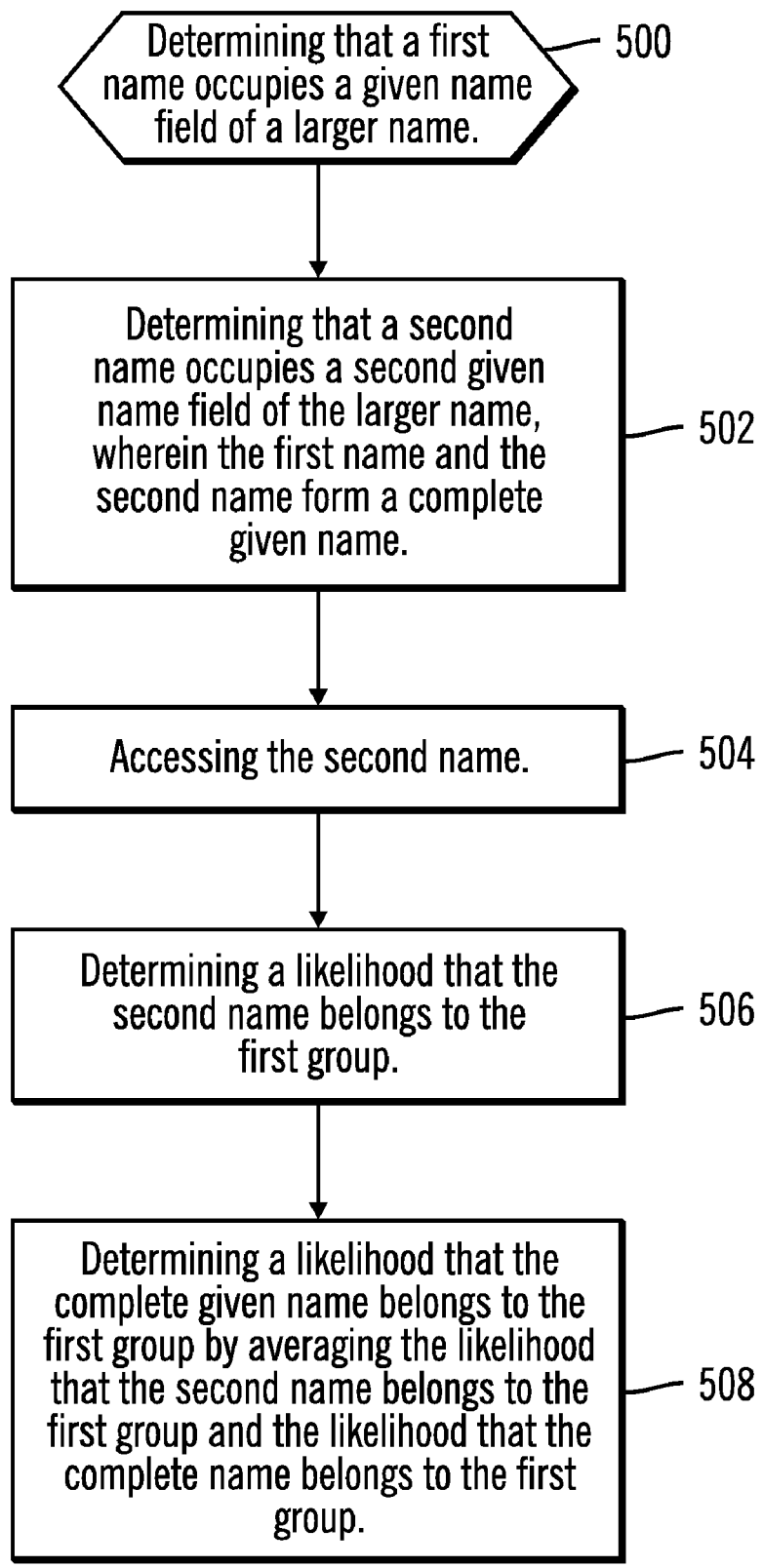
FIG. 5 illustrates, in a flow diagram, logic performed by a name classification system for given name fields in accordance with certain embodiments.

FIG. 5 illustrates, in a flow diagram, logic performed by a name classification system for given name fields in accordance with certain embodiments. Control begins in block 500 with the name classification system 110 determining that a first name occupies a given name field of a larger name. In block 502, the name classification system determines that a second name occupies a second given name field of the larger name, wherein the first name and the second name form a complete given name. In block 504, the name classification system 110 accesses the second name. In block 506, the name classification system 110 determines a likelihood that the second name belongs to the first group. In block 508, the name classification system 110 determines a likelihood that the complete given name belongs to the first group by averaging the likelihood that the second name belongs to the first group and the likelihood that the complete name belongs to the first group, In certain embodiments, each field consists of zero or more strings. Each segment in each field is assigned a score for each of the groups, and these scores are then averaged if there is more than one segment in a given field. For example, if John Jacob is entered into the given name field, each name (segment) is scored separately and the two are averaged to obtain the score for any given group. At this point, each field has generated a vector of sixteen scores (or more, as the number of supported groups increase). Finally a score for each group is obtained by Equation (11):

$$\text{Total Score} = (\text{Surname score} * 0.6) + (\text{Given name score} * 0.4) \quad \text{Equation (11)}$$

The name classification system 110 returns the group with the highest score. The weights assigned to different fields may vary based on group.

A number of implementations have been described. Nevertheless, it will be understood that various modifications may be made. For example, constants may be varied, scaling or normalizing or other factors may be used or varied, and the size of "n" in the n-grams may be varied even within the application of an implementation to a specific name. Accordingly, other implementations are within the scope of the following claims.

The details of one or more embodiments are set forth in the accompanying drawings and the description herein. Other features are apparent from the description and drawings, and from the claims.

The embodiments described herein may be expanded in various ways, all of which are not explicitly described herein. However, one of ordinary skill in the art will readily understand and appreciate that various other embodiments are both enabled and contemplated by this disclosure. Focus on certain embodiments is provided herein to better describe some of the features. However, such a focus does not limit the features to such embodiments. Any group that might otherwise appear to be closed or limiting should generally be construed as being open and non-limiting, for example, by being construed to be referring to a specific embodiment and not to be foreclosing other embodiments.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 6:
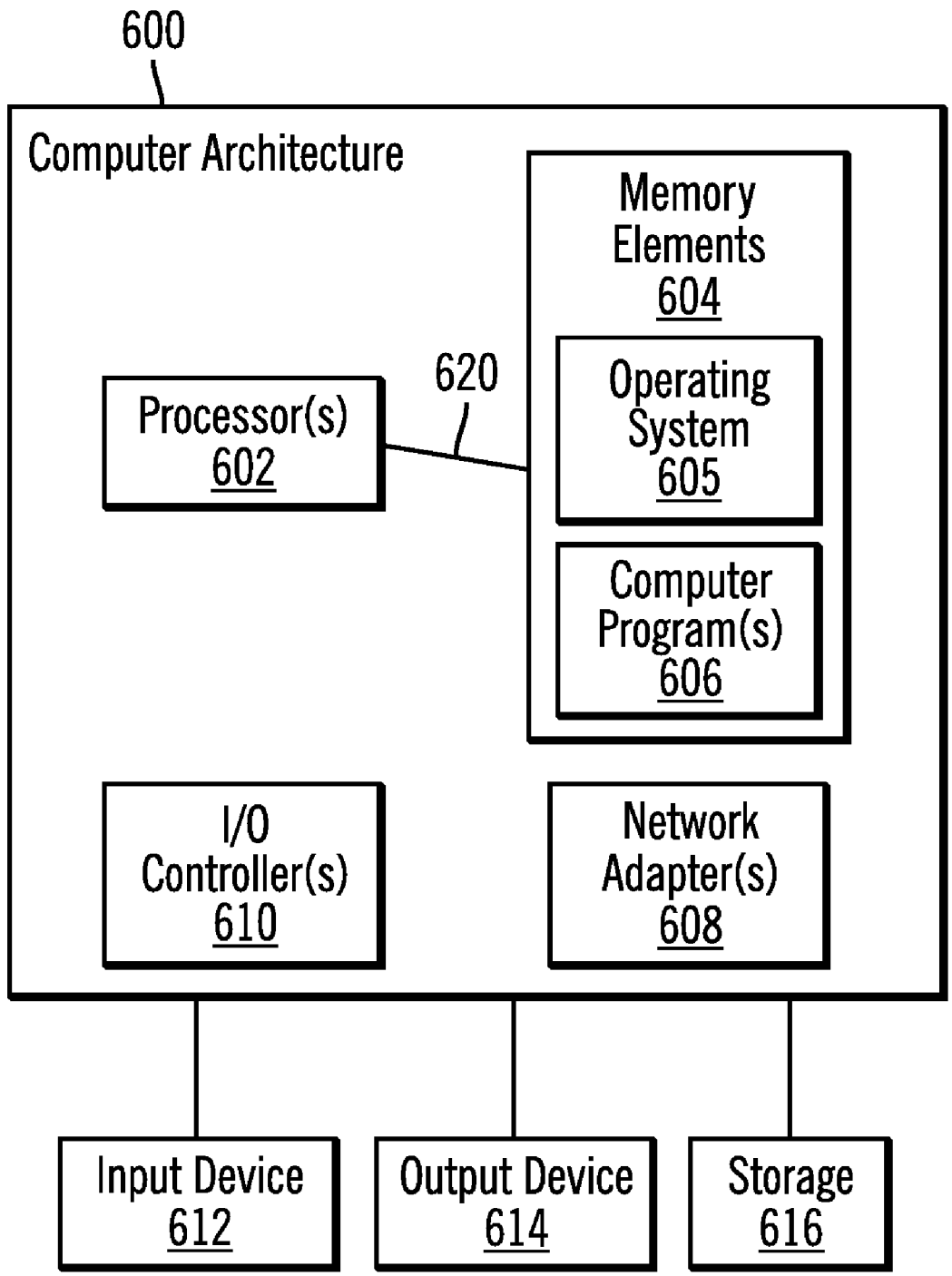
FIG. 6 illustrates a computer architecture that may be used in accordance with certain embodiments.

FIG. 6 illustrates a computer architecture 600 that may be used in accordance with certain embodiments. Computing device 100 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:

accessing a name;

dividing, using a computer including a processor, the name into a series of first n-grams;

forming multiple concatenated second n-grams by concatenating pairs of the first n-grams;

for each of multiple groups, for each of the second n-grams, determining the term frequency-group frequency score using equation:

$$((0.5+(0.5*(\text{number of times the second n-gram occurs in a group}))/(\text{number of times a most common n-gram occurs in the group}))*((\text{number of times the second n-gram occurs in the group})/(\text{number of times the second n-gram occurs in the multiple groups}));$$

for each of the multiple groups, summing up the term frequency-group frequency scores for each second n-gram for that group; and determining a likelihood that the name belongs to one group of the multiple groups based on the summed scores, wherein a largest summed score indicates a greater likelihood that the name belongs to the one group.

2. The method of claim 1, wherein each of the multiple groups comprises one of a language and a culture.

3. The method of claim 1, further comprising:
normalizing a likelihood that the name belongs to the one group.

4. The method of claim 1, wherein the one group is a first group and further comprising:
determining a likelihood that the name belongs to a second group based on the summed scores, wherein a second largest score indicates the likelihood that the name belongs to the second group.

5. The method of claim 4, further comprising:
classifying the name as belonging to either the first group or the second group based on the likelihood that the name belongs to the first group and the likelihood that the name belongs to the second group.

6. The method of claim 1, further comprising:
determining that the name is a surname;
assigning a surname weight to the name based on the determination that the name is a surname;
determining a weighted likelihood that the surname belongs to a first group by multiplying a likelihood that the surname belongs to a first group by the surname weight;
accessing a given name that corresponds to the surname, wherein the given name and the surname form a complete name;
determining a likelihood that the given name belongs to the first group;
assigning a given-name weight to the given name;
determining a weighted likelihood that the given name belongs to the first group by multiplying a likelihood that the given name belongs to the first group by the given-name weight; and
determining a likelihood that the complete name belongs to the first group by adding the weighted likelihood that the given name belongs to the first group and the weighted likelihood that the surname belongs to the first group.

7. The method of claim 1, wherein the name is a first name and further comprising:
determining that the first name occupies a given name field of a larger name;
determining that a second name occupies a second given name field of the larger name, wherein the first name and the second name form a complete given name;
accessing the second name;
determining a likelihood that the second name belongs to the first group; and
determining a likelihood that the complete given name belongs to the first group by averaging the likelihood that the second name belongs to the first group and the likelihood that the complete name belongs to the first group.

8. A system, comprising:
hardware logic performing operations, the operations comprising:
accessing a name;
dividing, using a computer including a processor, the name into a series of first n-grams;
forming multiple concatenated second n-grams by concatenating pairs of the first n-grams;
for each of multiple groups, for each of the second n-grams, determining the term frequency-group frequency score using equation:

((0.5+(0.5*(number of times the second n-gram occurs in a group))/(number of times a most common n-gram occurs in the group))*((number of times the second n-gram occurs in the group)/(number of times the second n-gram occurs in the multiple groups));

for each of the multiple groups, summing up the term frequency-group frequency scores for each second n-gram for that group; and
determining a likelihood that the name belongs to one group of the multiple groups based on the summed scores, wherein a largest summed score indicates a greater likelihood that the name belongs to the one group.

9. The system of claim 8, wherein each of the multiple groups comprises one of a language and a culture.

10. The system of claim 8, wherein the operations further comprise:
normalizing a likelihood that the name belongs to the one group.

11. The system of claim 8, wherein the one group is a first group and wherein the operations further comprise:
determining a likelihood that the name belongs to a second group based on the summed scores, wherein a second largest score indicates the likelihood that the name belongs to the second group.

12. The system of claim 11, wherein the operations further comprise:
classifying the name as belonging to either the first group or the second group based on the likelihood that the name belongs to the first group and the likelihood that the name belongs to the second group.

13. The system of claim 8, wherein the operations further comprise:
determining that the name is a surname;
assigning a surname weight to the name based on the determination that the name is a surname;
determining a weighted likelihood that the surname belongs to a first group by multiplying a likelihood that the surname belongs to a first group by the surname weight;
accessing a given name that corresponds to the surname, wherein the given name and the surname form a complete name;
determining a likelihood that the given name belongs to the first group;
assigning a given-name weight to the given name;
determining a weighted likelihood that the given name belongs to the first group by multiplying a likelihood that the given name belongs to the first group by the given-name weight; and
determining a likelihood that the complete name belongs to the first group by adding the weighted likelihood that the given name belongs to the first group and the weighted likelihood that the surname belongs to the first group.

14. The system of claim 8, wherein the name is a first name and wherein the operations further comprise:
determining that the first name occupies a given name field of a larger name;
determining that a second name occupies a second given name field of the larger name, wherein the first name and the second name form a complete given name;
accessing the second name;
determining a likelihood that the second name belongs to the first group; and
determining a likelihood that the complete given name belongs to the first group by averaging the likelihood that the second name belongs to the first group and the likelihood that the complete name belongs to the first group.

15. A computer program product comprising a computer readable storage medium including a computer readable program, wherein the computer readable program when executed by a processor on a computer causes the computer to:

access a name;

divide the name into a series of first n-grams;

forming multiple concatenated second n-grams by concatenating pairs of the first n-grams;

for each of multiple groups, for each of the second n-grams, determining the term frequency-group frequency score using equation:

((0.5+(0.5*(number of times the second n-gram occurs in a group))/(number of times a most common n-gram occurs in the group))*((number of times the second n-gram occurs in the group)/(number of times the second n-gram occurs in the multiple groups));

for each of the multiple groups, summing up the term frequency-group frequency scores for each second n-gram for that group; and determining a likelihood that the name belongs to one group of the multiple groups based on the summed scores, wherein a largest summed score indicates a greater likelihood that the name belongs to the one group.

16. The computer program product of claim 15, wherein each of the multiple groups comprises one of a language and a culture.

17. The computer program product of claim 15, wherein the computer readable program when executed by the processor on the computer causes the computer to:

normalize a likelihood that the name belongs to the one group.

18. The computer program product of claim 15, wherein the one group is a first group and wherein the computer readable program when executed by the processor on the computer causes the computer to:

determine a likelihood that the name belongs to a second group based on the summed scores, wherein a second largest score indicates the likelihood that the name belongs to the second group.

19. The computer program product of claim 18, wherein the computer readable program when executed by the processor on the computer causes the computer to:

classify the name as belonging to either the first group or second group based on the likelihood that the name belongs to the first group and the likelihood that the name belongs to the second group.

20. The computer program product of claim 15, wherein the computer readable program when executed by the processor on the computer causes the computer to:

determine that the name is a surname;

assign a surname weight to the name based on the determination that the name is a surname;

determine a weighted likelihood that the surname belongs to a first group by multiplying a likelihood that the surname belongs to a first group by the surname weight;

access a given name that corresponds to the surname, wherein the given name and the surname form a complete name;

determine a likelihood that the given name belongs to the first group;

assign a given-name weight to the given name;

determine a weighted likelihood that the given name belongs to the first group by multiplying a likelihood that the given name belongs to the first group by the given-name weight; and determine a likelihood that the complete name belongs to the first group by adding the weighted likelihood that the given name belongs to the first group and the weighted likelihood that the surname belongs to the first group.

21. The computer program product of claim 15, wherein the name is a first name and wherein the computer readable program when executed by the processor on the computer causes the computer to:

determine that the first name occupies a given name field of a larger name;

determine that a second name occupies a second given name field of the larger name, wherein the first name and the second name form a complete given name;

access the second name;

determine a likelihood that the second name belongs to the first group; and determine a likelihood that the complete given name belongs to the first group by averaging the likelihood that the second name belongs to the first group and the likelihood that the complete name belongs to the first group.

* * * * *